(12) United States Patent
Moore et al.

(10) Patent No.: US 10,030,402 B2
(45) Date of Patent: Jul. 24, 2018

(54) REAR-ORIENTED DEBRIS CANISTER

(71) Applicant: ZODIAC POOL SYSTEMS, INC., Vista, CA (US)

(72) Inventors: Michael Edward Moore, Johannesburg (ZA); Hendrikus Johannes van der Meijden, Midrand (ZA)

(73) Assignee: ZODIAC POOL SYSTEMS, LLC, Vista, CA (US)

( * ) Notice: Subject to any disclaimer, the term of this patent is extended or adjusted under 35 U.S.C. 154(b) by 0 days.

(21) Appl. No.: 15/281,671

(22) Filed: Sep. 30, 2016

(65) Prior Publication Data

US 2017/0096828 A1   Apr. 6, 2017

Related U.S. Application Data

(60) Provisional application No. 62/236,447, filed on Oct. 2, 2015.

(51) Int. Cl.
| | |
|---|---|
| *E04H 4/16* | (2006.01) |
| *C02F 1/00* | (2006.01) |
| *B01D 29/05* | (2006.01) |
| *B01D 35/26* | (2006.01) |
| *C02F 103/42* | (2006.01) |

(52) U.S. Cl.
CPC .......... *E04H 4/1654* (2013.01); *B01D 29/05* (2013.01); *B01D 35/26* (2013.01); *C02F 1/001* (2013.01); *C02F 2103/42* (2013.01)

(58) Field of Classification Search
CPC .... E04H 4/1654; C02F 1/001; C02F 2103/42; B01D 29/05; B01D 35/26

USPC .......................... 210/167.16, 167.17; 15/1.7
See application file for complete search history.

(56) References Cited

U.S. PATENT DOCUMENTS

| | | | |
|---|---|---|---|
| 4,749,478 A | 6/1988 | Brooks et al. | |
| 5,336,403 A * | 8/1994 | Marbach | ............... E04H 4/1618 15/1.7 |
| 6,601,255 B1 | 8/2003 | van der Meyden et al. | |
| 8,784,652 B2 | 7/2014 | Rief et al. | |
| 2015/0128361 A1 | 5/2015 | Erlich et al. | |

(Continued)

FOREIGN PATENT DOCUMENTS

| | | |
|---|---|---|
| DE | 2801394 | 7/1979 |
| WO | 9933582 | 7/1999 |

OTHER PUBLICATIONS

International Patent Application No. PCT/US2016/054713, International Search Report and Written Opinion, dated Dec. 21, 2016, 11 pages.

*Primary Examiner* — Fred Prince
(74) *Attorney, Agent, or Firm* — Kilpatrick Townsend & Stockton LLP; Dean W. Russell

(57) ABSTRACT

Swimming pool cleaners are detailed with filtration components attached at the rears of their bodies. At least some of the components may be external to a body, rather than within it, so as to provide greater surface area for filtered water to exit. They also may allow users to view the quantity of debris trapped in the filter without having to dissemble the cleaner. By contrast with many existing external filter bags, moreover, the components need not protrude materially above (or below) the heights of the bodies, hence avoiding creation of hydraulic drag as the cleaners move within pools, spas, or other liquid-containing vessels.

8 Claims, 3 Drawing Sheets

(56) References Cited

U.S. PATENT DOCUMENTS

2016/0051913 A1     2/2016   Witelson et al.
2016/0199759 A1     7/2016   Gopalan et al.

\* cited by examiner

REAR-ORIENTED DEBRIS CANISTER

CROSS-REFERENCE TO RELATED APPLICATION

This application claims the benefit of and priority to U.S. Provisional Patent Application Ser. No. 62/236,447, filed Oct. 2, 2015, and having the same title as appears above, the entire contents of which application are hereby incorporated by this reference.

FIELD OF THE INVENTION

This invention relates to debris collection components of swimming pool cleaners and more particularly, but not necessarily exclusively, to debris-receiving canisters positioned at rears of hydraulic, pressure-side automatic pool cleaners (APCs).

BACKGROUND OF THE INVENTION

Hydraulic APCs typically are classified as either "suction-side" or "pressure-side" depending on whether their associated water hoses communicate with inlets (the "suction side") or outlets (the "pressure side") of water-circulation pumps. Suction-side APCs conventionally lack any on-board debris filtration. Instead, debris ingested by a suction-side APC is passed through the cleaner and its associated hose to a filter remote from the cleaner.

By contrast, pressure-side APCs often include on-board debris filtration. Such an on-board filter typically is a mesh bag attached at a mouth to a head of an APC. The mesh bag is elongated vertically and attaches to, and protrudes upward from, a top of the cleaner body. Particularly when the bag contains a substantial amount of debris, its positioning atop the body can lead to significant hydraulic drag impeding movement of the APC within a pool. This may be true as well for non-porous filters protruding upward from tops of cleaner bodies.

These drag issues, together with limitations on mouth sizes, restrict the sizes and overall volumetric capacities of conventional on-board filters for pressure-side APCs. Designing these types of filters to match design lines of APC bodies additionally may be difficult, as may be selecting a single mesh size satisfactory to capture fine debris yet not clog unduly. Moreover, because the mesh itself conventionally is opaque, users of these existing filters cannot always view debris captured by the filters so as to know when to empty them.

SUMMARY OF THE INVENTION

The present invention resolves issues such as these relating to existing pressure-side filtration. Embodiments of the innovative APCs include filtration components attached at the rears of their bodies. The components need not protrude materially above (or below) the heights of the bodies, hence avoiding creation of hydraulic drag as the APCs move within pools, spas, or other liquid-containing vessels. Further, the filtration components may be debris canisters of any desired shape and varying sizes (particularly varying depths), so that users may select among differing volumetric debris-capturing capacities depending on the quantity of debris needed to be collected. Preferably, the debris canisters may use common connectors to attach to the bodies of the APCs so as easily to be interchangeable by users as desired.

The debris canisters may include one or more mesh panels. Placing the mesh panels at rears of cleaner bodies allows users to view the quantity of debris loading a canister merely by viewing through the mesh. A canister also may include panels of different mesh sizes, thus allowing one panel to function as a pre-filter of larger debris, for example, facilitating another panel's capturing of finer debris. Moreover, such a finer mesh panel conceivably may be by-passed when clogged, thus allowing continued operation of an APC employing the pre-filter for debris collection.

It thus is an optional, non-exclusive object of the present invention to provide filtration components for APCs.

It is also an optional, non-exclusive object of the present invention to provide APCs having bodies with filtration components attached at rears thereof.

It is a further optional, non-exclusive object of the present invention to provide rear-oriented filtration components that need not protrude materially above (or below) the heights of the bodies of their associated APCs.

It is another optional, non-exclusive object of the present invention to provide APCs having filtration components including debris canisters of varying sizes.

It is, moreover, an optional, non-exclusive object of the present invention to provide debris canisters having mesh panels allowing users to view debris loads within the canisters.

Other objects, features, and advantages of the present invention will be apparent to those skilled in the relevant art with reference to the remaining text and the drawings of this application.

DETAILED DESCRIPTION

Figure 1:
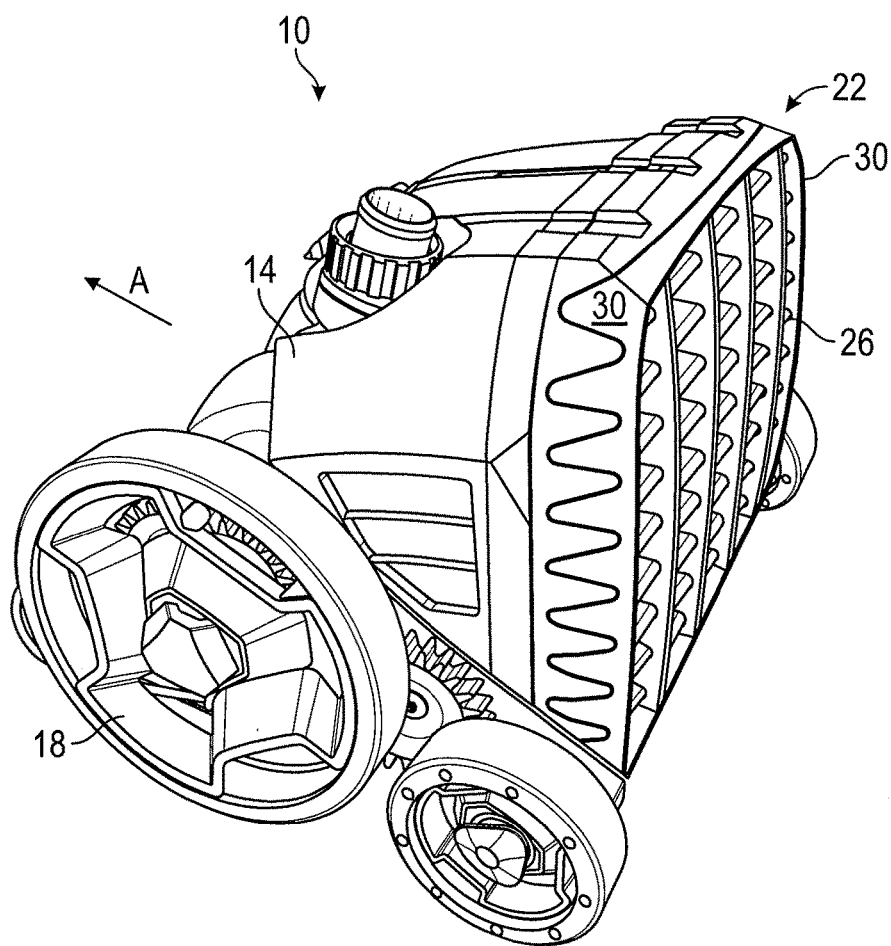
FIG. 1 is a perspective view of an exemplary APC consistent with concepts of the present invention.

FIG. 1 illustrates an exemplary APC 10 including body 14 and drive system 18. In use within a vessel, APC 10 normally travels in the direction of arrow A. Accordingly, area 22 of body 14 may be defined as the "rear" of APC 10.

Shown as connected to area 22 is exemplary canister 26 for collection of debris ingested by APC 10 during operation. Clear from FIG. 1 is that canister 26 need not extend above (or below) body 14, instead protruding rearward from area 22. Stated differently, canister 26 is designed so as not to be wholly internal to body 14 yet not materially increase hydraulic drag as APC 10 moves within a swimming pool.

In the version of APC 10 shown in FIG. 1, canister 26 extends the entire width of area 22 of body 14. While such extension is not mandatory, the larger width of canister 26 significantly decreases the restriction otherwise present on water flowing therethrough. Consequently, the associated water-circulation pump need not work as hard as with a conventional cleaner to force water through canister 26.

Although canister 26 need not extend above (or below) body 14, as noted above, it may do so if desired. Nevertheless, canister 26 preferably is not attached to the top of body 14. FIG. 1 depicts canister 26 as having height approximately equal to that of body 14 at area 22. This increased height (as compared at least to standard internal filters) likewise decreases the restriction otherwise present on water flowing through the canister 26, again decreasing load on the water-circulation pump.

At least one version of canister 26 comprises one or more mesh panels and a support frame 30 therefor. Either alone or together with other structure of APC 10, canister 26 forms a region capable of trapping and retaining debris yet allowing water carrying that debris to pass through for return to the pool. Because the mesh panels are visible externally of body 14, a user of APC 10 may view through the mesh to see the quantity of debris present in canister 26 without disassembling any portion of the APC 10.

Conventional top-placed, vertically-oriented mesh bag filters lack any support frame. Accordingly, they lack any discernable shape when not subjected to pressurized water flow. By contrast, support frame 30 preferably is rigid in normal use, thus maintaining the shape of canister 26 regardless of whether water is flowing therethrough.

Figure 2:
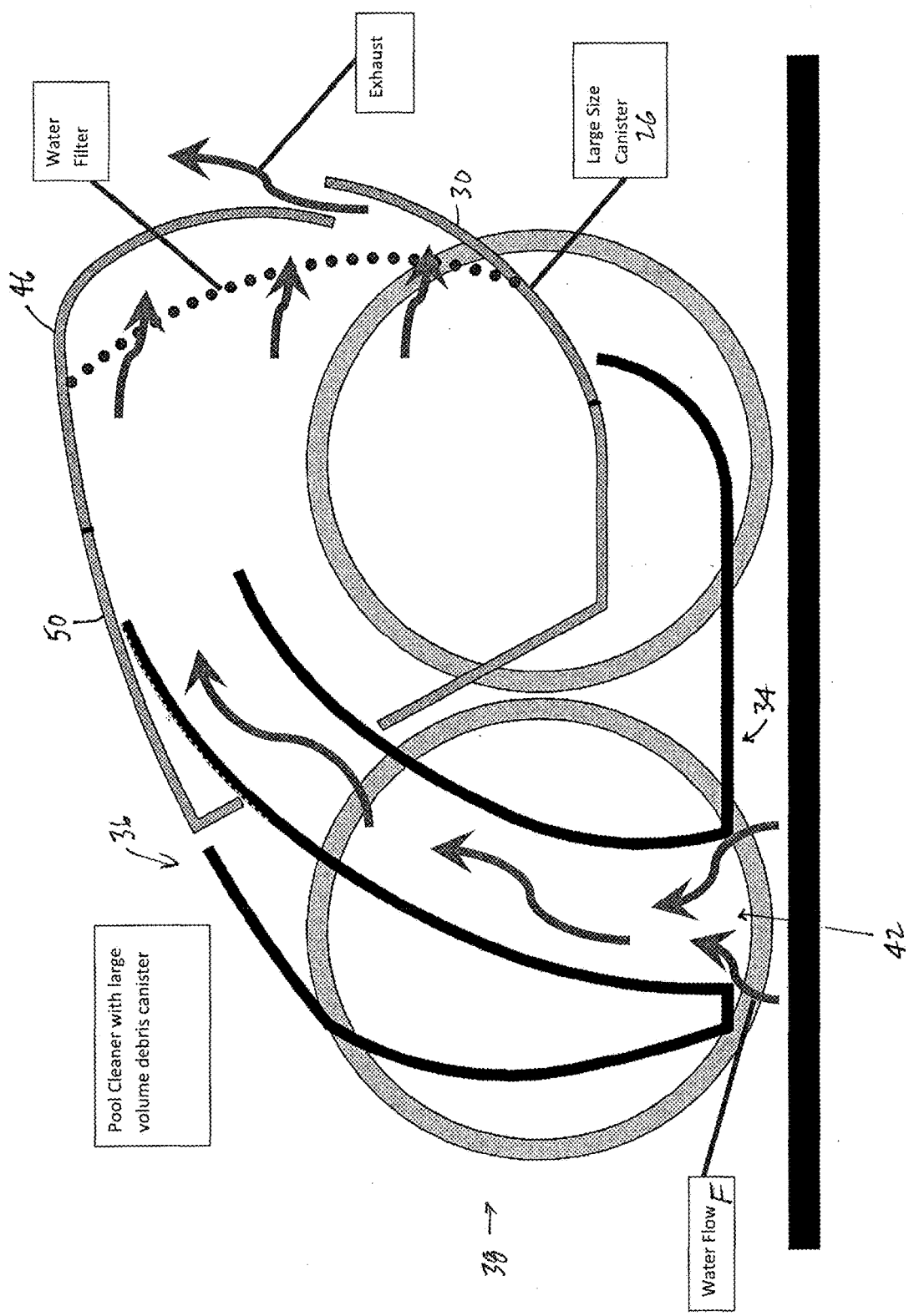
FIG. 2 is a schematicized, generally cross-sectional view of an APC similar to that of FIG. 1.

FIG. 2 schematically illustrates flow path F of water through an exemplary APC 10. As shown, body 14 includes a lower area 34, a top 36, and a "front" area 38 opposite "rear" area 22. Present in lower area 34 is inlet 42, which may—but need not necessarily—be forward of area 22. Operation of the associated water-circulation pump causes debris-laden pool water to enter body 14 through inlet 42.

Following entry via inlet 42, the debris-laden water travels along path F within body 14 toward rear area 22, where is encounters canister 26. The mesh panels of canister 26 block most solid debris while allowing water to pass therethrough. Because canister 26 is at the rear of APC 10, the water is immediately exhausted from body 14 without encountering further flow restriction.

Figure 3:
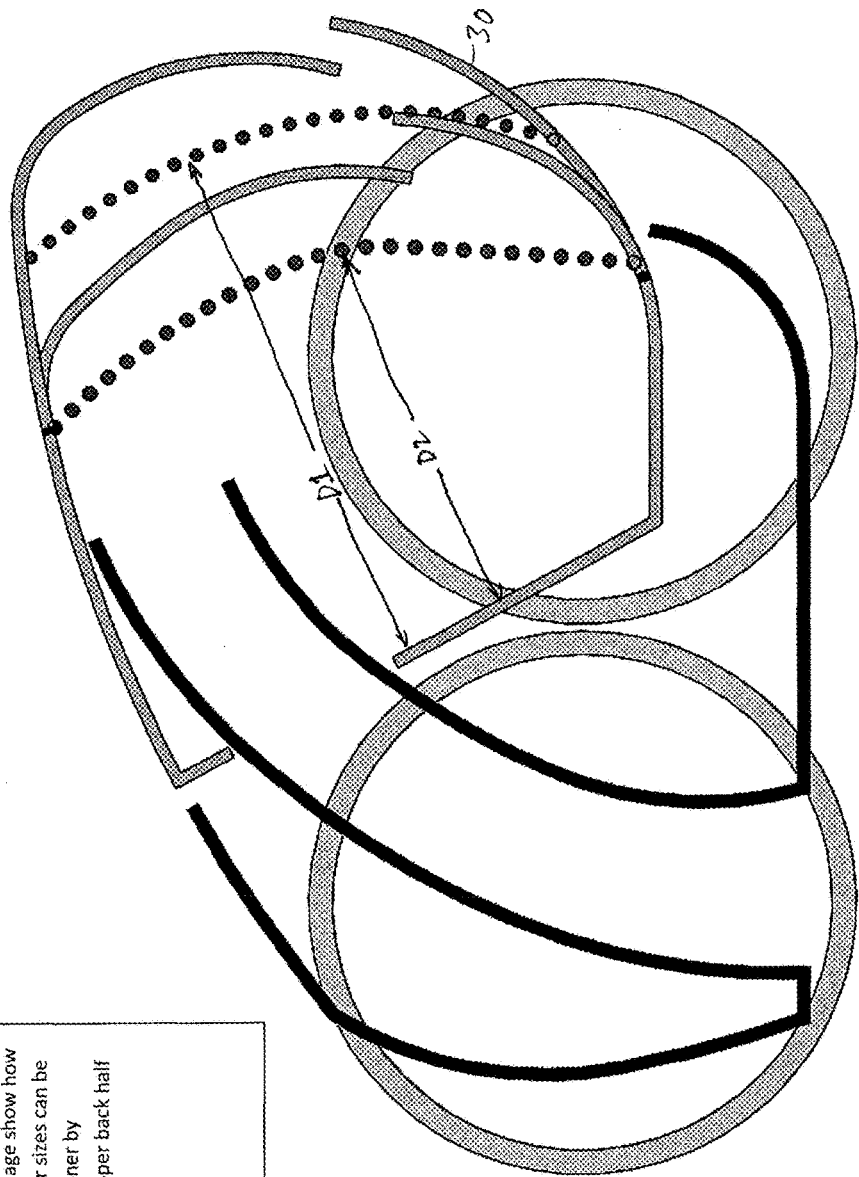
FIG. 3 is a schematicized, generally cross-sectional view of the APC of FIG. 2 also illustrating size differences between its debris (filtration) canister and a standard canister.

FIG. 3 illustrates an increased depth D1 available for canister 26 versus depth D2 of conventional internal filters. If support frame 30 is formed of at least two pieces, different sizes of canister 26 may be formed simply by replacing back half 46. Indeed, in some versions of APC 10, back half 46 may be snap-fit to (or otherwise easily attached to or detached from) fore half 50. Such easy attachment of back half 46 and fore half 50 facilitates changing the size of canister 26, and in some cases may facilitate emptying debris from canister 26 as well.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. An automatic swimming pool cleaner comprising:
   a. a body having (i) a water inlet and (ii) a rear area;
   b. a drive system configured in use to move the body automatically within a swimming pool; and
   c. a debris canister (i) having a shape, (ii) being connected to the body at the rear area, (iii) having at least a portion external to the body configured so that water having entered the body through the water inlet returns to a swimming pool therethrough when the automatic swimming pool cleaner is in use, and (iv) comprising mesh panels and a support frame, (A) at least one of the mesh panels being external to the body and configured to exhaust water directly to the swimming pool and (B) the support frame maintaining the shape of the debris canister regardless of whether water is flowing therethrough.

2. An automatic swimming pool cleaner according to claim 1 in which the body has a height and the debris canister spans substantially the height of the body.

3. An automatic swimming pool cleaner according to claim 1 in which the body has a width and the debris canister spans substantially the width of the body.

4. An automatic swimming pool cleaner according to claim 1 in which the support frame is rigid and the at least one mesh panel allows viewing of debris therethrough.

5. An automatic swimming pool cleaner comprising:
   a. a body having (i) a water inlet and (ii) a rear area; and
   b. a debris canister (i) connected to the body at the rear area, (ii) having at least a portion external to the body configured so that water having entered the body through the water inlet returns to a swimming pool therethrough when the automatic swimming pool cleaner is in use, and (iii) comprising mesh panels and a support frame, and in which (A) at least one of the mesh panels is external to the body and (B) the support frame comprises a fore half and a back half configured to attach thereto.

6. An automatic swimming pool cleaner according to claim 5 in which the back half is configured to be detached from the fore half for replacement with another back half of different size.

7. An automatic swimming pool cleaner comprising:
   a. a body having (i) a water inlet, (ii) a rear area, (iii) a height, and (iv) a width; and
   b. a debris canister (i) connected to the body at the rear area, (ii) having at least a portion external to the body configured so that water having entered the body through the water inlet returns to a swimming pool therethrough when the automatic swimming pool cleaner is in use, (iii) spanning substantially the height and width of the body, and (iv) comprising mesh panels and a rigid support frame, at least one of the mesh panels being external to the body and allowing viewing of debris therethrough and the support frame comprising a fore half and a back half configured to attach thereto, the back half also being configured to be detached from the fore half for replacement with another back half of different size.

8. An automatic swimming pool cleaner comprising:
   a. a body having a water inlet;
   b. a drive system configured in use to move the body automatically within a swimming pool; and
   c. a debris canister (i) having a shape, (ii) being connected to the body, (iii) having at least a portion external to the body configured so that water having entered the body through the water inlet returns to a swimming pool therethrough when the automatic swimming pool cleaner is in use, and (iv) comprising mesh panels and a support frame, (A) at least one of the mesh panels being external to the body and configured to exhaust water directly to the swimming pool and (B) the support frame maintaining the shape of the debris canister regardless of whether water is flowing therethrough.

\* \* \* \* \*